(12) United States Patent
Baker et al.

(10) Patent No.: US 12,536,296 B2
(45) Date of Patent: Jan. 27, 2026

(54) AUTOMATED SOFTWARE TESTING USING CHAOS ENGINEERING

(71) Applicant: Microsoft Technology Licensing, LLC, Redmond, WA (US)

(72) Inventors: William Tigard Baker, Redmond, WA (US); Dallas Allen Warren, Redmond, WA (US); Aaron Edward Dietrich, Kirkland, WA (US); Piyush Gupta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 18/214,627

(22) Filed: Jun. 27, 2023

(65) Prior Publication Data

US 2025/0005162 A1 Jan. 2, 2025

(51) Int. Cl.
*G06F 21/57* (2013.01)
*G06F 11/263* (2006.01)
*G06F 11/34* (2006.01)
*G06F 11/3668* (2025.01)

(52) U.S. Cl.
CPC .......... *G06F 21/577* (2013.01); *G06F 11/263* (2013.01); *G06F 11/3409* (2013.01); *G06F 11/3466* (2013.01); *G06F 11/3684* (2013.01); *G06F 11/3688* (2013.01); *G06F 2221/033* (2013.01)

(58) Field of Classification Search
CPC ............. G06F 11/3409; G06F 11/3684; G06F 11/3688; G06F 11/3466; G06F 11/263; G06F 21/577; G06F 2221/033
See application file for complete search history.

(56) References Cited

U.S. PATENT DOCUMENTS

| | | | |
|---|---|---|---|
| 9,507,701 B2 | 11/2016 | Mirza | |
| 9,842,045 B2 * | 12/2017 | Heorhiadi | G06F 11/3692 |
| 10,795,793 B1 | 10/2020 | Arunachalam | |
| 10,819,618 B1 | 10/2020 | Wada et al. | |
| 2014/0082420 A1 | 3/2014 | Greer | |

(Continued)

FOREIGN PATENT DOCUMENTS

CN 112907140 A 6/2021

OTHER PUBLICATIONS

International Search Report and Written Opinion received for PCT Application No. PCT/US2024/034226, mailed on Oct. 17, 2024, 19 pages.

(Continued)

*Primary Examiner* — Geoffrey R St Leger
(74) *Attorney, Agent, or Firm* — Cantor Colburn LLP; Patrick Chinkiwsky

(57) ABSTRACT

Aspects of the disclosure include methods and systems for performing automated software testing using chaos engineering. An exemplary method can include obtaining a plurality of fault scenarios and executing a test script on software under test during application of each of the plurality of fault scenarios, wherein the test script simulates the execution of a function of the software under test. The method also includes recording, for each of the plurality of fault scenarios, telemetry data regarding the execution of the function of the software under test and identifying a vulnerability of the software under test based on the recorded telemetry data.

18 Claims, 9 Drawing Sheets

| Anomaly ID | Comp. Resource_ID | Comp. Resource_Type | Anomaly Type | Anomaly rate | Anomaly start_time | Anomaly end_time |
|---|---|---|---|---|---|---|
| 0101 | 23562 | Memory | MEMORY PRESSURE | 5% | 0:10 | 0:30 |
| 0102 | 45620 | Communications link | Congestion | 50% | :01 | :15 |
| 0105 | 45620 | Communications link | Congestion | 75% | :16 | :20 |

(56) References Cited

U.S. PATENT DOCUMENTS

| | | | |
|---|---|---|---|
| 2018/0191579 A1 | 7/2018 | Gururao et al. | |
| 2018/0285239 A1* | 10/2018 | Papak | G06F 11/3644 |
| 2019/0065345 A1* | 2/2019 | Patel | G06F 11/3684 |
| 2022/0245045 A1* | 8/2022 | Ajiro | G06F 11/3476 |
| 2022/0308972 A1 | 9/2022 | Anand et al. | |
| 2022/0353143 A1 | 11/2022 | Hill | |
| 2022/0398187 A1 | 12/2022 | Balasubramanian | |
| 2024/0118991 A1 | 4/2024 | Zakharchenko | |
| 2024/0311201 A1 | 9/2024 | Jha | |
| 2024/0385950 A1 | 11/2024 | Verma | |
| 2024/0388496 A1 | 11/2024 | Garcarz | |
| 2024/0411542 A1 | 12/2024 | Goyal | |
| 2025/0053501 A1 | 2/2025 | Ayyadurai et al. | |
| 2025/0077374 A1 | 3/2025 | Baker et al. | |

OTHER PUBLICATIONS

Invitation to pay additional fees received for PCT Application No. PCT/US2024/034228, Oct. 11, 2024, 20 pages.

Ji, et al., "PerfCE: Performance Debugging on Databases with Chaos Engineering-Enhanced Causality Analysis", arXiv:2207.08369v2, Sep. 14, 2023, 13 pages.

Sharma, et al., "A Guided Approach Towards Complex Chaos Selection, Prioritisation and Injection", 15th International Conference on Cloud Computing (CLOUD), 2022, pp. 91-93.

International Search Report and Written Opinion received for PCT Application No. PCT/US2024/034228, mailed on Dec. 5, 2024, 24 pages.

"Chaos Engineering", Tech Target and Informa Tech's Digital Businesses Combine, Jun. 2021, 10 pages.

Hiter, Shelby, "7 Steps of the Vulnerability Assessment Process Explained", eSecurity Planet, Apr. 12, 2023, 8 pages.

Final Office Action mailed on May 19, 2025, in U.S. Appl. No. 18/214,609, 27 Pages.

Non-Final Office Action mailed on Jan. 29, 2025, in U.S. Appl. No. 18/214,609, 23 pages.

Notice of allowance mailed on Aug. 13, 2025, in U.S. Appl. No. 18/214,609, 10 pages.

\* cited by examiner

| Software Under Test ID | Configuration ID | Fault Scenario ID | Test Script ID | Telemetry Metric 1 | Telemetry Metric ... | Telemetry Metric N | SLI 1 | SLI ... | SLI N |
|---|---|---|---|---|---|---|---|---|---|
| 0001 | 1001 | 0001 | 132 | | | | | | |
| 0001 | 1001 | 0001 | 122 | | | | | | |
| 0001 | 1001 | 0001 | 125 | | | | | | |
| 0001 | 1001 | 0002 | 132 | | | | | | |

FIG. 3

| FAULT SEC ID | Anomaly ID_1 | Anomaly ID_2 | ... | Anomaly ID_N |
|---|---|---|---|---|
| 0001 | 0101 | 0102 | | 0107 |
| 0002 | 0102 | 0105 | | 0109 |
| 0003 | 0101 | 0107 | | 1111 |
| 0004 | 0102 | 0107 | | 1025 |

| Anomaly ID (504) | Comp. Resource_ID (506) | Comp. Resource_Type (508) | Anomaly Type (510) | Anomaly rate (512) | Anomaly start_time (514) | Anomaly end_time (516) |
|---|---|---|---|---|---|---|
| 0101 | 23562 | Memory | MEMORY PRESSURE | 5% | 0:10 | 0:30 |
| 0102 | 45620 | Communications link | Congestion | 50% | :01 | :15 |
| 0105 | 45620 | Communications link | Congestion | 75% | :16 | :20 |

FIG. 6

| Configuration ID (604) | Computing Resource_ID (606) | Computing Resource_Type (608) | Related Computing Resource_ID (610) | Relation Type (612) | Related Computing Resource_ID (610) | Relation Type (612) |
|---|---|---|---|---|---|---|
| 1001 | 12354 | Processing System | 45620 | Connected to | 45630 | Connected to |
| 1001 | 23562 | Memory | 12354 | Part of | | |
| 1001 | 36523 | Processor | 12354 | Part of | | |
| 1001 | 45620 | Communications link | 12354 | Connected to | | |

AUTOMATED SOFTWARE TESTING USING CHAOS ENGINEERING

INTRODUCTION

The subject disclosure relates to software testing, and particularly to automated software testing using chaos engineering.

Testing software prior to its release is often performed to ensure the quality and reliability of the software. Proper testing helps identify bugs, errors, and usability issues, allowing developers to fix them before the software reaches users. Traditionally, testing of new software was a manual task that required software developers to spend significant resources to ensure proper operation of the software. Attempts to reduce the time and resources required for testing new software products led to the use of test scripts to test software. Automated testing with test scripts significantly improved the efficiency of the software testing process because scripts can execute tests much faster than manual testing, allowing for quicker feedback on the software's quality and reducing the time required for testing. In addition, test scripts ensure that the same set of tests are executed consistently, eliminating human errors and variations in test execution.

Chaos engineering is a discipline that involves intentionally introducing controlled disruptions or failures into a service or software system to test its resilience and identify potential weaknesses. One goal of chaos engineering is to discover and address vulnerabilities before they occur in real-world scenarios. Currently, chaos engineering systems require users to manually design experiments to simulate various failure scenarios. These experiments are then executed to inject failures or disruptions into the system. During the experiments the behavior of the system is monitored, and relevant metrics and data are collected and analyzed the system's response to the various failures.

Current software testing systems apply test scripts to software that is deployed in a computing environment operating under normal, or ideal conditions. As a result, bugs, errors, and usability issues of the software that may occur in real world scenarios due to a disruption or failure in the computing environment may not be discovered before release of the software.

SUMMARY

Embodiments of the present disclosure are directed to methods for automated software testing using chaos engineering. An example method includes obtaining a plurality of fault scenarios and executing a test script on software under test during application of each of the plurality of fault scenarios, wherein the test script simulates the execution of a function of the software under test. The method also includes recording, for each of the plurality of fault scenarios, telemetry data regarding the execution of the function of the software under test and identifying a vulnerability of the software under test based on the recorded telemetry data.

Embodiments of the present disclosure are directed to methods for automated software testing using chaos engineering. An example method includes obtaining a first plurality of fault scenarios, executing a test script on software under test during application of each of the first plurality of fault scenarios, wherein the test script simulates the execution of a function of the software under test, and recording, for each of the first plurality of fault scenarios, telemetry data regarding the execution of the function of the software under test. The method also includes selecting, based on the telemetry data, a first fault scenario from the first plurality of fault scenarios and generating, based at least in part on the first fault scenario, a second plurality of fault scenarios. The method further includes executing the test script on the software under test during the application of each of the second plurality of fault scenarios and identifying a vulnerability of the software under test based on the recorded telemetry data.

Embodiments of the present disclosure are directed to methods for automated software testing using chaos engineering. An example method includes obtaining a plurality of fault scenarios, executing a test script on software under test during application of each of the plurality of fault scenarios, wherein the test script simulates the execution of a function of the software under test, and recording, for each of the plurality of fault scenarios, telemetry data regarding the execution of the function of the software under test. The method also includes calculating, based on the recorded telemetry data, a service level indicator regarding the execution of the function of the software under test during the application of each of the plurality of fault scenarios, determining that the service level indicator deviates from a service level objective by more than a threshold amount, and identifying a vulnerability of the software under test.

The above features and advantages, and other features and advantages of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

FIG. 3 depicts a table of an example telemetry database illustrating a plurality of fault scenarios and telemetry metrics associated with each of the plurality of fault scenarios in accordance with one or more embodiments;

FIG. 4 depicts a table of an example telemetry database illustrating a plurality of fault scenarios and a plurality of anomalies associated with each of the plurality of fault scenarios in accordance with one or more embodiments;

FIG. 5 depicts a table of an example telemetry database illustrating a plurality of anomalies in accordance with one or more embodiments;

FIG. 6 depicts a table of an example telemetry database illustrating a plurality of configurations of the software under test in accordance with one or more embodiments;

Figure 1:
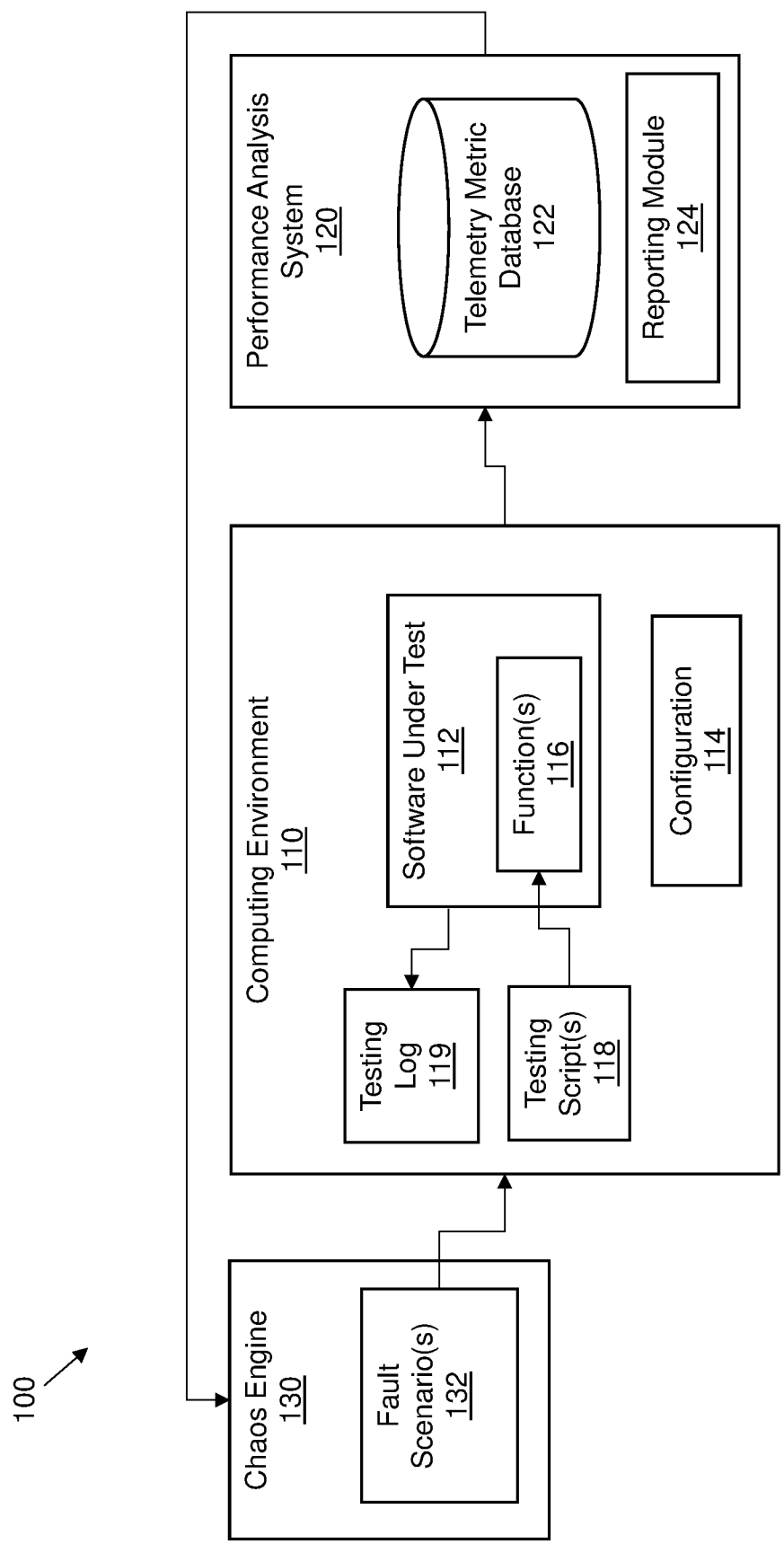
FIG. 1 depicts a block diagram of an example system for automated software testing using chaos engineering in accordance with one or more embodiments.

The diagrams depicted herein are illustrative. There can be many variations to the diagrams, or the operations described therein without departing from the spirit of the disclosure. For instance, the actions can be performed in a differing order or actions can be added, deleted, or modified.

In the accompanying figures and following detailed description of the described embodiments of the disclosure, the various elements illustrated in the figures are provided with two or three-digit reference numbers. With minor exceptions, the leftmost digit(s) of each reference number corresponds to the figure in which its element is first illustrated.

DETAILED DESCRIPTION

As discussed above, current methods for performing software testing apply test scripts to software that is deployed in a computing environment operating under normal, or ideal conditions. As a result, bugs, errors, and usability issues of the software that may occur in real world scenarios due to a disruption or failure in the computing environment may not be discovered before release of the software.

This disclosure involves the application of chaos experiments, also referred to herein as fault scenarios, to a computing environment in which the software under test is deployed and the execution of test scripts during the chaos experiments to identify vulnerabilities of the software under test. In one embodiment, each test script is configured to test a function of the software under test and collect telemetry data regarding the execution of the functions during various fault scenarios is collected. The collected telemetry data is analyzed to identify disruptions or failures that occur during the chaos experiments.

The manual creation and regular maintenance of test scripts to validate a service or software is time-consuming. Additionally, the work to execute these test scripts, whether it be manually executing them or manually scheduling them to run during an experiment, is a time-consuming task that is prone to errors.

The manual creation of chaos experiments is time-consuming to both create and update as both the software and the configuration of the computing environment can change over time. In addition, since each chaos experiment must be manually crafted, the scope and breadth of the chaos experiments are limited to the type and combination of failures that are foreseeable to the designer of the chaos experiments.

This disclosure also involves the automatic creation of chaos experiments to perform automated software testing using chaos engineering. In one embodiment, a configuration of a computing environment in which the software under test is executing is obtained and a chaos engine creates a first set of fault scenarios based on the configuration. The first set of fault scenarios may be generated by randomly creating anomalies that are applied to various computing resources of the configuration. The first set of fault scenarios are then applied to the computing environment while test scripts are executed on the software under test. Telemetry metrics regarding the performance, availability, and reliability of the software under test during each of the fault scenarios are collected.

The chaos engine then analyzes the telemetry metrics regarding the performance, availability, and reliability of the software under test during each of the fault scenarios and responsively creates a second set of fault scenarios. The second set of fault scenarios are then applied to the computing environment while test scripts are executed on the software under test and telemetry metrics regarding the performance, availability, and reliability of the software under test during each of the fault scenarios are collected. This iterative process can be repeated a desired number of times, for a desired duration, or until another condition is met.

In one embodiment, a performance analysis system is provided that calculates a service level indicator (SLI) for each function of the software under test during the application of each fault scenario. The SLIs can be compared to service level objectives (SLOs) of the function to identify fault scenarios in which the SLIs fail to meet the SLOs. In one embodiment, a vulnerability of the software under test can be identified based on commonalities of fault scenarios in which the SLIs fail to meet the provided SLOs. In another embodiment, identifying a vulnerability of the software under test includes identifying one or more of the fault scenarios that have SLIs that fail to meet the specified SLOs. In some embodiments, the performance analysis system also monitors for the occurrence of high importance events like crashes in the service under test.

In one embodiment, one or more test scripts are generated automatically through the analysis of the application programing interfaces (APIs) of the software under test. The chaos engine is configured to select test scripts that are known to succeed from the set of all automatically generated test scripts for the software under test. By automatically generating and selecting test scripts, the time required to create and maintain the test scripts is reduced. In addition, the chaos engine can give preference to the test scripts that correspond to operations identified by the owner of the software under test. As a result, the chaos engine will focus on execution of the test scripts that exercise operations that the service owner cares about during chaos experiments.

Advantageously, by executing test scripts on the software under test during the chaos experiments, errors that only occur during the chaos experiments can be discovered. As a result, automated software testing using chaos engineering increases the number of bugs, errors, and usability issues that are discovered during testing of the software under test. In addition, automated software testing using chaos engineering reduces the amount of time required to perform software testing using chaos engineering by automatically creating chaos experiments and test scripts to be applied to the software under test. Furthermore, software testing using chaos engineering increases the scope and breadth of the disruptions and failures included in the fault scenarios by iteratively creating new fault scenarios and test scripts to apply to the software under test based on identified impacts of previously applied fault scenarios. By executing test scripts during chaos experiments, software developers are able to confirm that their high-value software operations are working as intended. As a result of applying automated software testing using chaos engineering, the reliability of the software under test is improved. In addition, by identifying vulnerabilities of the software using chaos experiments (i.e., prior to the occurrence of real-world anomalies), the reliability of the software and computing configuration can be improved.

Referring now to FIG. 1, a block diagram of a system 100 for automated software testing using chaos engineering in accordance with one or more embodiments is shown. As illustrated, the system 100 includes a computing environment 110, a performance analysis system 120, and a chaos engine 130. Although illustrated as discrete items, one or more of the computing environment 110, the performance analysis system 120, and the chaos engine 130 may be embodied in a single computing system, such as the one shown in FIG. 11. Alternatively, each of the computing environment 110, the performance analysis system 120, and the chaos engine 130 may be embodied in separate computing systems, such as the one shown in FIG. 11.

In one embodiment, the computing environment 110 includes a configuration 114 of computing resources (i.e., hardware, software, and network resources) that are used to execute the software under test 112. The computing environment 110 includes monitoring and logging mechanisms that capture relevant telemetry metrics, errors, and performance data of the computing resources and the software under test 112 during execution of test scripts 118 on functions 116 of the software under test 112. The telemetry metrics, errors, and performance data are recorded in the telemetry metric database 122 of the performance analysis system 120. The telemetry metrics also include data regarding the performance, availability, and reliability of the functions 116. For example, the telemetry data can include data regarding whether one or more actions were successfully completed by the functions 116 as a result of running the test scripts 118. In one embodiment, the computing environment 110 also includes a testing log 119 that is configured to log the results of applying the testing scripts 118 to the software under test 112.

In one embodiment, the test scripts 118 are manually created. In one embodiment, the test scripts 118 are automatically created. In one example, the test scripts 118 can be generated automatically through the analysis of the application programing interfaces (APIs) of the software under test 112. For example, a test script 118 for a function 116 can be created by identifying instances of the execution of the function, capturing the API calls made prior to the execution of the function 116, and analyzing the captured API calls to identify the API calls that relate to the execution of the function 116. The automatic creation of the test scripts 118 may be performed by the computing environment 110, the chaos engine 130, or by another suitable processing device that is configured to analyze the APIs of the software under test 112. In one embodiment, each test script 118 is associated with a function of the software under test 112.

In one embodiment, a function 116 is an operation of the software under test that can include one or more actions. In one embodiment, the function 116 includes executing a specific sequence of actions, such as API calls. In another example, the function includes performing a sequence of actions on a graphical user interface (GUI) of the software. In one example, the software under test is an e-commerce application and the functions include buying an item, returning an item, adding a stored payment method, and the like. In one embodiment, a testing script 118 is a plurality of actions that are performed to execute the function 116. For example, a testing script 118 for buying an item may include actions for adding the item to a cart, selecting checkout, entering payment information and confirming the purchase. In one embodiment, each function 116 includes a priority level that can be set by the owner/developer of the software under test 112. The priority level can be used to identify which function 116 should be subject to the most testing.

In one embodiment, the chaos engine 130 operates on a computing system that is configured to create fault scenarios 132 that are applied to the computing environment 110 of the software under test 112. Each fault scenario 132 is a chaos experiment that includes a combination of various anomalies, such. as injecting network latency, randomly terminating services, introducing CPU spikes, or simulating sudden increases in user traffic. The chaos engine 130 can generate fault scenarios 132 based on one or more of the configuration 114 of computing environment 110, data relating to the operation of the software under test 112 from the performance analysis system 120, and user input. For example, the chaos engine 130 may obtain the configuration 114 of the computing environment 110 to identify the computing resources in the computing environment 110 and use this information during the creation of the anomalies in the fault scenarios.

In one embodiment, the configuration 114 of the computing environment 110 and data relating to the operation of the software under test 112 under a first fault scenario are recorded in a telemetry metric database 122 of the performance analysis system 120. The chaos engine 130 is configured to analyze the data in the telemetry metric database 122 relating to the operation of the software under test 112 under the first fault scenario and to responsively generate one or more additional fault scenarios that are applied to the software under test. In one embodiment, the analysis of the data in the telemetry metric database 122 includes comparing the SLIs corresponding of the first fault scenario to the SLOs of the software. By analyzing the data in the telemetry metric database 122 relating to the operation of the software under test 112 under the first fault scenario the chaos engine 130 identifies one or more anomalies of the first fault scenario that impacted the operation of the software under test 112 and generates additional fault scenarios by modifying the identified anomalies. For example, a determination that an anomaly of the first fault scenario that impacted the operation of the software under test 112 can be based on identifying an anomaly related to the SLI that has a highest deviation from its corresponding SLO. The chaos engine 130 may iteratively create new additional fault scenarios by modifying anomalies to quantify the impact that each anomaly has on the software under test 112. For example, SLIs corresponding to a first fault scenarios having a dropped packet anomaly with an anomaly rate of fifty percent can be compared to SLIs corresponding to fault scenarios having a dropped packet anomaly with an anomaly rates of twenty-five and seventy-five percent, to quantify the impact that the dropped packet anomaly has on the software under test 112. In one embodiment, the impact that the dropped packet anomaly can be quantified by providing an anomaly rate at which the SLI begins to fail to meet its corresponding SLO.

In one embodiment, an iterative process of applying a fault scenario, simulating an operation of the software under test during the application of the fault scenario, recording and analyzing performance data of the software under test during the fault scenario, and responsively generating one or more additional fault scenario is performed. As used herein, applying a fault scenario includes performing one or more actions to the computing resources affected by the anomalies in the fault scenario to simulate the occurrence of the anomaly. For example, a fault scenario may include a partial failure of a transmission link and this failure of the transmission link can be simulated by instructing a router or switch associated with the transmission link to drop a specified percentage of the packets using the transmission link. The process is repeated until a termination condition is met. In one embodiment, the termination condition may specify a total time allowed for the testing of various fault scenarios. In another embodiment, the termination condition may be a determination that a service level indicator of the software under test has exceeded a threshold value, which may be set by an operator of the software under test 112. In a further embodiment, the termination condition may be a determination that a service level indicator of the software under test has deviated from an expected value by more than a threshold amount, which may be set by an operator of the software under test 112.

In one embodiment, the performance analysis system 120 is a computing system that analyzes the response of the software under test 112 to the testing scripts 118 and the performance, availability, and reliability of computing resources utilized by the software under test 112. The performance analysis system 120 collects and records telemetry data from the computing environment 110 and the software under test 112 in the telemetry database 122.

In one embodiment, the performance analysis system 120 calculates one or more Service Level Indicators (SLIs) of the software under test 112 based on the data recorded in the telemetry database 122. SLIs are measurements used to assess the performance, availability, and quality of the software under test 112. In one embodiment, one or more SLIs can be created for each function 116 of the software under test. The SLIs can include, but are not limited to, availability SLIs, response time SLIs, throughput SLIs, error rate SLIs, latency SLIs, and capacity SLIs of the software under test 112.

Availability SLIs measure the uptime or the percentage of time the software under test 112 is available to users. Availability SLIs indicate the reliability and accessibility of the software under test 112. Availability is typically expressed as a percentage. Response time SLIs measure the time it takes for the software under test 112 to respond to a request. Response time SLIs indicate the performance and reliability and user experience of the software under test 112. Response time is typically measured in milliseconds and can be broken down into metrics like average response time, 95th percentile response time, etc. Throughput SLIs measure the number of requests or transactions the software under test 112 can handle within a given time period. Throughput SLIs indicate the capacity and scalability of the software under test 112. Throughput is often measured in requests per second (RPS) or transactions per second (TPS). Error rate SLIs measure the percentage of failed or erroneous requests or transactions. Error rate SLIs indicate the reliability and the occurrence of errors or failures in the system under test. The error rate can be expressed as a percentage or the number of errors per a specific number of requests. Latency SLIs measure the time it takes for a request to travel from the sender to the receiver and receive a response. Latency SLIs indicate the responsiveness of the system under test 112. Latency is typically measured in milliseconds. Capacity SLIs measure the resource utilization and capacity limits of the software under test 112. Capacity SLIs can include metrics like CPU usage, memory usage, disk space utilization, or network bandwidth consumption. Capacity SLIs help identify when the software under test 112 is approaching its resource limits and may require scaling or optimization.

In one embodiment, the performance analysis system 120 identifies one or more vulnerabilities of the software under test 112 based on one or more of the calculated SLIs of the software under test 112, the data stored in the telemetry database 122, and one or more Service Level Objectives (SLOs) of the software under test 112. In one embodiment, an SLI and SLO for each function 116 of the software under test 112 are compared to assess the operation of the software under test 112. In one embodiment, the SLOs are desired target values for each SLI. In another embodiment, the SLOs are acceptable ranges for each SLI. The SLOs of the software under test 112 may be set by an operator of the software under test 112.

In general, a vulnerability of the software under test 112 is a sensitivity of the software under test 112 to changes in operating conditions of the computing resources that make up the configuration 114 of the computing environment 100 in which the software under test 112 is executing. For example, a software under test 112 is considered sensitive to an anomaly when that anomaly causes an SLI of the software under test 112 to fail to meet a corresponding SLO. For example, a vulnerability of the software under test 112 may be a sensitivity of the software under test 112 to dropped packet anomalies that have an anomaly rate (e.g., a dropped packet rate) that is greater than fifty percent. In another example, another vulnerability of the software under test 112 is a sensitivity of the software under test 112 to a combination of a dropped packet anomaly and an out of order delivery anomaly in which a dropped packet rate is greater that a specific percentage and an out of order deliver rate is greater than a specific amount. In one embodiment, the vulnerability of the software under test 112 is identified based on a determination that one or more anomalies cause one or more SLI of the software under test 112 to fail to meet the provided SLOs.

In one embodiment, the performance analysis system 120 identifies one or more vulnerabilities of the software under test 112 based on recorded error data and crash data of the software under test 112. For example, the performance analysis system 120 may identify fault scenarios that resulted in a crash of the software under test 112 or the software under test 112 generating an error message as indicating a vulnerability of the software under test 112. These fault scenarios can be reported to the owner/developer of the software under test 112 for further analysis.

In one embodiment, the performance analysis system 120 includes a reporting module 124 that generates one or more reports, or error notifications, regarding the operation of the software under test 112 under the various fault scenarios. In addition, the reporting module 124 may transmit an identification of identified vulnerabilities of the software under test 112.

Figure 2:
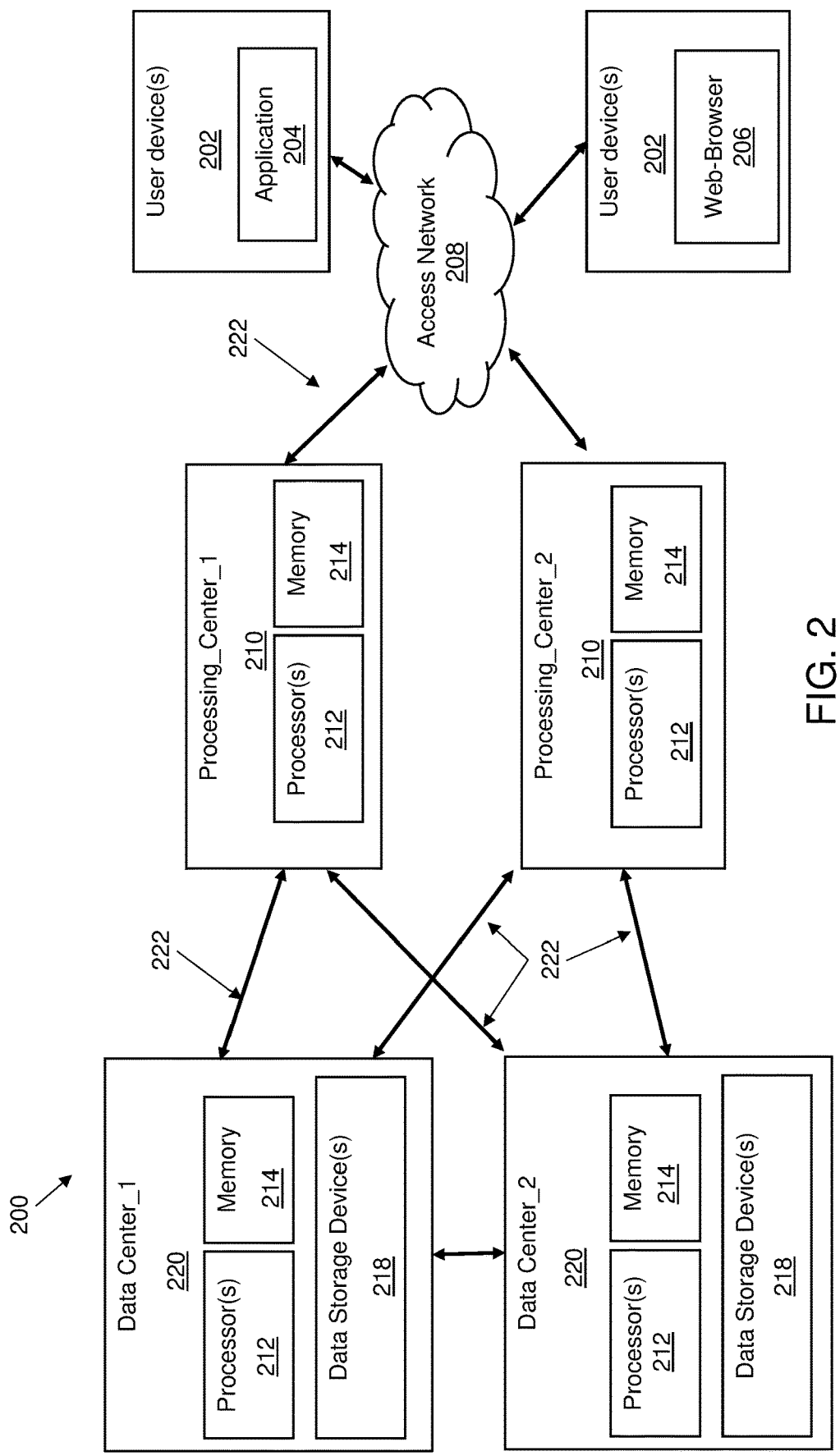
FIG. 2 depicts a block diagram of an example configuration of a computing environment for the software under test in accordance with one or more embodiments.

Referring now to FIG. 2, a block diagram of a configuration of a computing environment for the software under test in accordance with one or more embodiments is shown. The configuration 200 shown is exemplary in nature and is not intended to be limiting in any way. In one embodiment, the configuration 200 includes a plurality of computing resources that are utilized to execute the operation of the software under test.

In one embodiment, the configuration 200 includes a plurality of user devices 202 that are in communication with one or more processing centers 210 via an access network 208 and one or more communications links 222. The user devices 202 can include a variety of user devices, such as personal computers, smartphones, tablets, or the like. The user devices 202 can include various software, such as applications 204, web browsers 206, or the like that is used to access the software under test, which is being executed by the one or more processing centers 210. In one embodiment, the applications 204, web browsers 206, or the like utilize application programing interface (API) calls to interact with the software under test. In one embodiment, the processing centers 210 include multiple computing resources, such as one or more processors 212 and memory devices 214.

In one embodiment, the configuration 200 also includes a plurality of data centers 220 that may be directly connected to one or more of the processing centers 210 via communications links 222. In one embodiment, the data centers 220 may be directly connected to one another via one or more communications links 222. In one embodiment, the data centers 220 include multiple computing resources, such one or more processors 212, memory devices 214, and data storage device 218.

In some embodiments, a configuration 200 for the software under test may include additional elements that are not shown in FIG. 2. In one embodiment, the configuration 200 for the software under test is created and managed by an operator of the software under test. The configuration 200 includes an identification of each computing resource (e.g., the access network 208, the processing centers 210, the processors 212, the memory 214, the data storage devices 218, the data centers 220, and the communication links 222) in the configuration and a relationship between one or more of the plurality of computing resources. In one embodiment, each computing resource can be characterized by a unique identification number and a type of the resource.

In one embodiment, each anomaly of the plurality of fault scenarios includes an abnormal operating condition for one of the computing resources in the configuration 200. The fault scenarios are applied to the configuration and test scripts are executed to simulate the use of a function of the software under test. Applying the fault scenarios includes performing one or more actions to the computing resources affected by the anomalies in the fault scenario to simulate the occurrence of the anomaly. For example, a fault scenario may include a partial failure of a transmission link 222 and this failure of the transmission link 222 can be simulated by instructing a processing center 201 (such as a router or switch) associated with the transmission link 222 to drop a specified percentage of the packets using the transmission link. In another example, another fault scenario may include a memory pressure of a memory 214 on a data center 220 and the memory pressure can be simulated by instructing the processor 212 of the data center 220 to execute a task to utilize a specified percentage of the memory device.

FIGS. 3, 4, 5, and 6 illustrate various tables of a telemetry database in accordance with one or more embodiments. The tables shown are intended to be examples and are not intended to be limiting in any way. In one embodiment, the chaos engine analyzes the data stored in the tables of the telemetry database to determine an impact that the applied fault scenarios had on the software under test. In addition, the chaos engine analyzes the data stored in the tables of the telemetry database to create additional fault scenarios that are applied to software under test.

FIG. 3 depicts a table 300 of a telemetry database illustrating a plurality of fault scenarios and test scripts and telemetry metrics associated with each of the plurality of fault scenarios and test scripts in accordance with one or more embodiments. As illustrated, table 300 includes a plurality of entries 302 that each include an identification of the software under test 304, an identification of the configuration 306 of the computing environment, an identification of a fault scenario 308 applied to the configuration of the computing environment, an identification of a test script 310 applied to the software under test, one or more telemetry metrics 312 collected during the application of the fault scenario and test script to the configuration of the computing environment, and one or more SLIs 314 calculated based on the telemetry metrics 312. In addition, the table 300 may include an SLO that corresponds to each SLI 314.

In one embodiment, the telemetry data includes data regarding the operation of each function of the software under test. This telemetry data can include whether one or more actions that are associated with the functions were successfully completed. Monitoring the ability of functions to successfully perform the one or more actions based on the application of the test scripts during different fault scenarios can expose the vulnerabilities of the functions to various applied anomalies.

In one embodiment, the telemetry data can include the current CPU utilization of the computing resources in the configuration, indicating the percentage of each CPU capacity being utilized. This data can be used to determine whether the CPU is under heavy load or if there is potential for optimization. The telemetry data also includes information on the memory usage of the computing resources in the configuration, including metrics such as total memory, used memory, and available memory. Monitoring memory usage helps ensure efficient memory allocation and prevents potential memory-related issues. The telemetry data can capture the input/output operations of the data storage device of the computing resources in the configuration, including metrics like read/write throughput, latency, and queue length. Disk I/O data can be used to assess disk performance and identify potential bottlenecks or areas for optimization.

In one embodiment, the telemetry data can also include network traffic information, such as incoming and outgoing data rates, packet loss, latency, and network errors of the computing resources in the configuration. Monitoring network traffic can be used to detect anomalies, identify potential network issues, and optimize network performance. The telemetry data can provide insights into the load of the computing resources in the configuration, which includes metrics like the number of active processes, threads, or concurrent connections. Monitoring system load can be used to ensure the system can handle the current workload and identifies potential resource limitations. The telemetry data can include application-specific performance metrics, such as response time, throughput, error rates, and transaction success rates. This data can be used to evaluate the performance and health of the application running on the computing resources in the configuration.

In one embodiment, the telemetry data can also include system and application event logs that capture events, errors, warnings, and debug information. Monitoring and analyzing event logs can be used to diagnose issues, troubleshoot problems, and identify potential areas for improvement. The telemetry data can further include information on power consumption and temperature readings of the computing resources in the configuration. In addition, the telemetry data can also include custom-defined metrics that are specific to the computing resource or the application running in the configuration. These metrics could be tailored to monitor specific behaviors, performance indicators, or unique requirements of the computing resources in the configuration.

FIG. 4 depicts a table 400 of a telemetry database illustrating a plurality of fault scenarios and a plurality of anomalies associated with each of the plurality of fault scenarios in accordance with one or more embodiments. As illustrated, table 400 includes a plurality of entries 402 that each include an identification of a fault scenario 404 and one or more anomalies 406 that comprise the fault scenario 404.

FIG. 5 depicts a table 500 of a telemetry database illustrating a plurality of anomalies in accordance with one or more embodiments. As illustrated, table 500 includes a plurality of entries 502 that each include an identification of an anomaly 504, an identification of a computing resource 506 that the anomaly will be applied to, an identification of a type 508 of the computing resource 506, an anomaly type 510 that will be applied, an anomaly rate 512 that will be applied, an anomaly start time 514, and an anomaly end time 516. In some embodiments, a single anomaly can include more than one anomaly type 510 and associated anomaly rate 512. For example, an anomaly of a disruption of network traffic could specify a dropped packet anomaly type 510 with an associated anomaly rate 512 of a percentage of packet to be dropped and an out of order delivery anomaly type 510 with an associated anomaly rate 512 of a percentage of packets to deliver out of order.

FIG. 6 depicts a table 600 of a telemetry database illustrating a plurality of configurations of the software under test in accordance with one or more embodiments. As illustrated, table 600 includes a plurality of entries 602 that each include an identification of the configuration 604 of the software under test, an identification of a computing resource 606 of the configuration, an identification of a type 608 of the computing resource 606, an identification of a related computing resource 610 of the computing resource 606, an identification of type 612 of the relationship between the computing resource 606 and the related computing resource 610. As illustrated, each computing resource of the software under test may be related to multiple other computing resources of the software under test.

Figure 7:
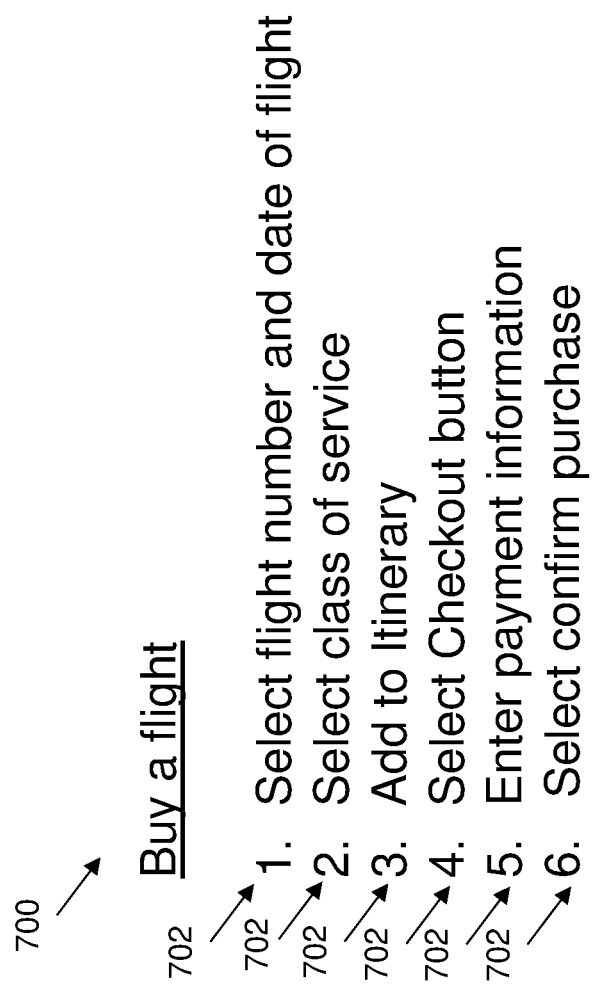
FIG. 7 depicts an example test script for executing a function of the software under test in accordance with one or more embodiments.

Referring now to FIG. 7, a test script 700 for executing a function of the software under test in accordance with one or more embodiments is shown. As illustrated, the test script 700 is a test script for performing a buy a flight function of the software under test. The test script includes a plurality of actions 702 that are performed to execute the function. In one embodiment, the completion of one or more of the actions 702 of the testing script 700 results in an event being recorded in a testing log that indicates successful performance of the action 702. In one embodiment, telemetry data indicating a successful completion of the entire script is recorded in a telemetry database along with script ID, the software under test ID, a configuration ID, and a fault scenario ID.

In one embodiment, the test script 700 is written by the software developer to test the operation of a function of the software under test. In another embodiment, the test script 700 is obtained based on analyzing user interactions with the software under test related to the function. For example, the user interactions with the software under test that preceded a desired action can be obtained and analyzed to create the testing script for the desired action. In some embodiments, multiple testing scripts 700 may be created that test the same function of the software under test.

In one embodiment, a test script can be automatically obtained by parsing the API specification (e.g., the OpenAPI specification for RESTful services) and identifying sequences of API calls received by the software under test that relate to the execution of a specific function. For example, a test script for a function can be created by identifying instances of the execution of the function, capturing the API calls received by the software under test prior to the execution of the function, and analyzing the captured API calls to identify the API calls that relate to the execution of the function. In one embodiment, the return value(s) of the API calls can also be analyzed, by the performance analysis system, to determine whether the call sequence of calls successfully completed (i.e., value(s) indicating success were returned). The telemetry emitted by the software under test during execution of the test scripts is analyzed to determine a correlation between the received API calls and the completed actions of the software under test. As a result, a set of test scripts that exercise specific functions (where each function includes a sequence of actions that correspond to API calls) of the software under test are created and the owner/developer can identify functions to be tested without having to manually create test scripts for each function.

Although the test script 700 is depicted as a set of actions in a natural language, the test script 700 is not limited to this format. In one embodiment, the test script may be a list of API calls rather than a set of actions in natural language. For example, a script for exercising REST APIs might be:

1. POST/api/carts HTTP/1.1\r\nAccept: application/json\r\nHost: localhost:7072\r\nContent-Type: application/json\r\nUser-Agent: testagent/1.0\r\n\r\n{\n "name":"rtszzufone" }\r\n
2. POST/api/carts/rtszzufone_cart/items HTTP/1.1\r\nAccept: application/json\r\nHost: localhost:7072\r\nContent-Type: application/json\r\nUser-Agent: testagent/1.0\r\n\r\n{\n "itemName": "rtszzuftwo",\n "quantity":1}\r\n
3. POST/api/carts/rtszzufone_cart/checkout HTTP/1.1\r\nAccept: application/json\r\nHost: localhost:7072\r\nUser-Agent: testagent/1.0\r\n\r\n, Where step 1 is an API call requesting a page regarding a product, step 2 is an API call requesting to add the product to a shopping cart, and step 3 is an API call initiating a checkout for the items in the shopping cart.

Figure 8:
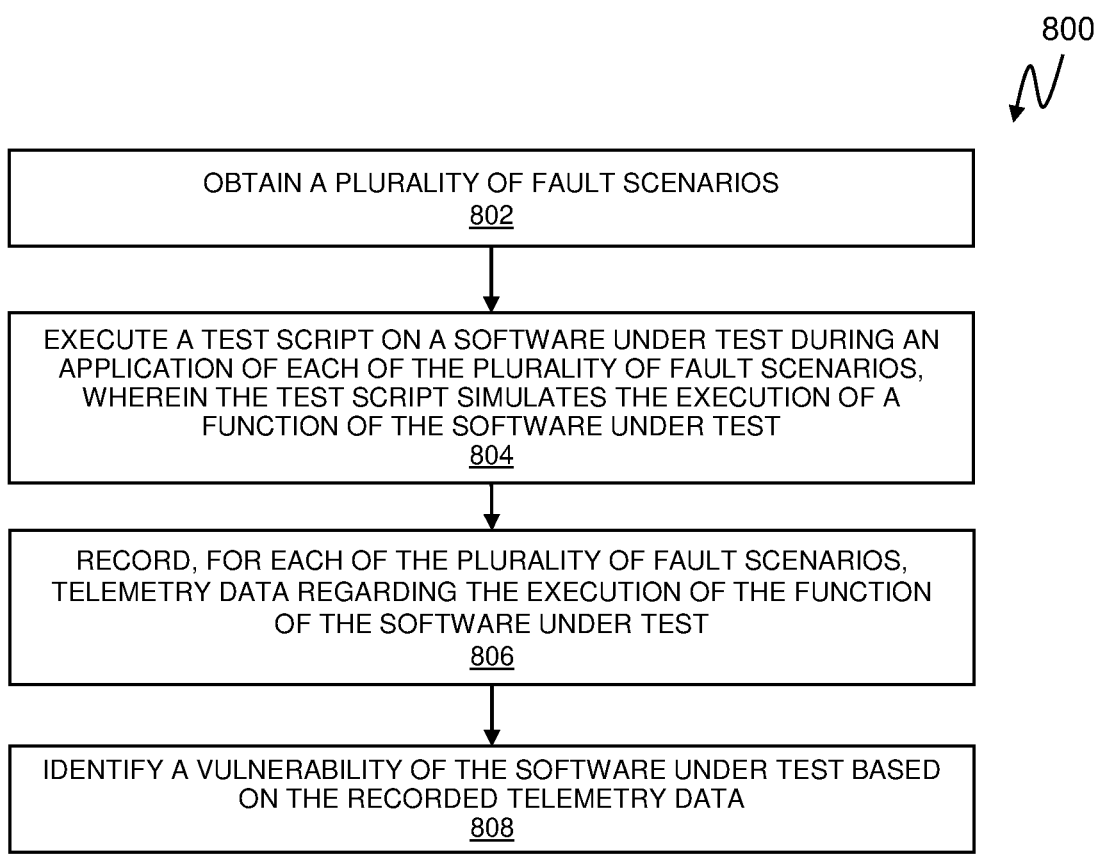
FIG. 8 depicts a flowchart of an example method for automated software testing using chaos engineering in accordance with one or more embodiments.

Referring now to FIG. 8, a flowchart of a method 800 for performing automated software testing using chaos engineering in accordance with one or more embodiments is shown. The method 800 is described with reference to FIGS. 1 to 7 and may include additional steps not depicted in FIG. 8. Although depicted in a particular order, the blocks depicted in FIG. 8 can be, in some embodiments, rearranged, subdivided, and/or combined.

At block 802, the method 800 begins by obtaining a obtaining a plurality of fault scenarios. Each fault scenario includes an anomaly that is applied to a computing resource of a configuration of a computing environment where the software under test is operating. The configuration of the computing environment includes a plurality of computing resources such as computing systems, communications links, data storage devices, and the like. Each anomaly is a disruption or failure of one or more of the computing resources in the configuration. In one embodiment, each anomaly includes one or more of a failure rate and a capacity reduction that is applied to a computing resource, a start time of the anomaly, and an end time of the anomaly. In one embodiment, the configuration of the computing environment includes a plurality of computing resources utilized by the software under test but does not include all of the computing resources utilized by the software under test. The computing resources included by the configuration may be set by the operator of the service. In other embodiments, the configuration of the computing environment includes all of the computing resources that are utilized by the software under test.

In one embodiment, the fault scenarios may be obtained based at least in part on the configuration of the computing environment. For example, the chaos engine may be configured to obtain the configuration of the computing environment and to identify a plurality of fault scenarios based on the configuration of computing environment of the software under test. This identification may be based on identifying one or more previously generated fault scenarios that were applied to similar configurations.

In one embodiment, at least one of the plurality of fault scenarios may be randomly generated by the chaos engine. For example, the chaos engine may be configured to obtain the configuration of computing environment, identify the computing resources in the configuration, and generate a random set of anomalies to create each of the fault scenarios. Each of the random anomalies may include both a randomly generated failure rate and a randomly generated start and end time. In one embodiment, one or more of the first set of fault scenarios is selected from previous runs of the system. For example, rather than starting with only randomly generated fault scenarios, the first set of fault scenarios can include one or more fault scenarios that were previously run on the service under test and that were identified as important (i.e., because those previous fault scenarios result in the service under test crossing its SLO thresholds). In another embodiment, the first set of fault scenarios can include one or more fault scenarios that are known to be impactful to other services that have been tested, when the configuration of those services is similar to the current service under test (e.g., both services might use VMs, switches, and a SQL server).

At block 804, the method 800 includes executing a test script on software under test during an application of each of the plurality of fault scenarios, wherein the test script simulates the execution of a function of the software under test.

In one embodiment, one or more of the test scripts are manually generated by an owner/developer of the software under test. In one embodiment, one or more of the test scripts are automatically generated based on a machine learning analysis of prior use of the software under test. In one embodiment, one or more of the test scripts are automatically generated based on analysis of an API specification of the software under test. In one embodiment, each of the test scripts corresponds to a function of the software under test and obtaining a set of test scripts to simulate use of the software under test includes obtaining test scripts related to an identified function to be exercised. The identified function to be exercised may be specified by an owner/developer or tester of the software under test. In one embodiment, the functions of the software under test are assigned priority level and functions and corresponding test scripts to be executed on the software under test are selected based on the priority level of the functions.

In one embodiment, executing a test script on software under test during an application of each of the plurality of fault scenarios includes simulating the occurrence of the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include a memory pressure of a memory device on a computing resource and the memory pressure can be simulated by executing a task by a processor to utilize a specified percentage of the memory device.

At block 806, the method 800 includes recording, for each of the plurality of fault scenarios, telemetry data regarding the execution of the function of the software under test. In one embodiment, the telemetry data is collected by the computing environment and recorded in a telemetry metric database. The telemetry data provides real-time information about the state, performance, availability, and reliability of the computing resources utilized by the service under test. The telemetry data includes whether an action associated with the function successfully completed during each fault scenario. In addition, as discussed in more detail above, the collected telemetry data can include, but are not limited to CPU usage, memory usage, disk I/O, network traffic, system load, application performance, event logs, power and temperature, and other custom metrics.

In one embodiment, one or more test scripts corresponding to each function of the software under test are executed multiple times during each fault scenario. Telemetry data indicating whether actions associated with the function successfully completed during the application of each fault scenario are collected and analyzed. In one embodiment, a service level indicator (SLI) corresponding to each function is calculated for each fault scenario based on the collected telemetry data. In one embodiment, the success or failure of a function is determined by return value(s) of the function, rather than by telemetry recorded by the software under test. In these embodiments, the return values may be recorded in the telemetry metric database.

At block 808, the method 800 includes identifying a vulnerability of the software under test based on the recorded telemetry data. In one embodiment, a vulnerability of the software under test is identified based on recorded error data and crash data of the software under test. For example, fault scenarios that result in a crash of the software under test or the software under test generating an error message are identified as corresponding to a vulnerability of the software under test. In general, a vulnerability of the software under test is a susceptibility of the software under test to an anomaly of one or more computing resources. For example, one vulnerability of the software under test may be a susceptibility of the software under test to a dropped packet anomaly in which a dropped packet rate is greater that a specific percentage. In one embodiment, these fault scenarios can be reported to the owner/developer of the software under test for further analysis. In one embodiment, the vulnerability of the software under test is identified based on a commonality of a group of the fault scenarios that have SLIs, calculated based on the telemetry data, that deviate from a SLO by more than a threshold amount. In one embodiment, one or more of the SLO and the threshold amount are provided by a developer of the software under test.

In one example, when a plurality of fault scenarios each result in SLIs that fail to meet the corresponding SLOs, the anomalies that make up each fault scenario can be compared to identify one or more common anomalies (e.g., anomalies having the same type and/or anomalies applied to the same computing resource). These common anomalies can be identified as vulnerabilities of the software under test. For example, a Completion Rate SLI of a function of the service under test may be calculated to be 89% based on the telemetry data and the expected value of the Completion Rate SLI is 95% with a threshold deviation amount of 5%. In this example, the calculated Completion Rate SLI associated with a first fault scenario deviates from the expected value 95% by more than the threshold amount of 5%.

In one embodiment, the expected value of the SLI and the threshold amount are received from a developer of the software under test. In one embodiment, the developer of the software under test may provide SLOs that include an expected SLI value and a threshold deviation amount for each SLI. In another example, the developer of the software under test may provide SLOs that include a minimum and/or maximum value for each SLI.

In another embodiment, the expected value of the service level indicator is obtained based on an analysis of telemetry data regarding the operation of the service under test under normal operating conditions. For example, the service under test may be executed without the application of any chaos experiments and telemetry data can be collected and analyzed to calculate the expected values for each SLI.

Figure 9:
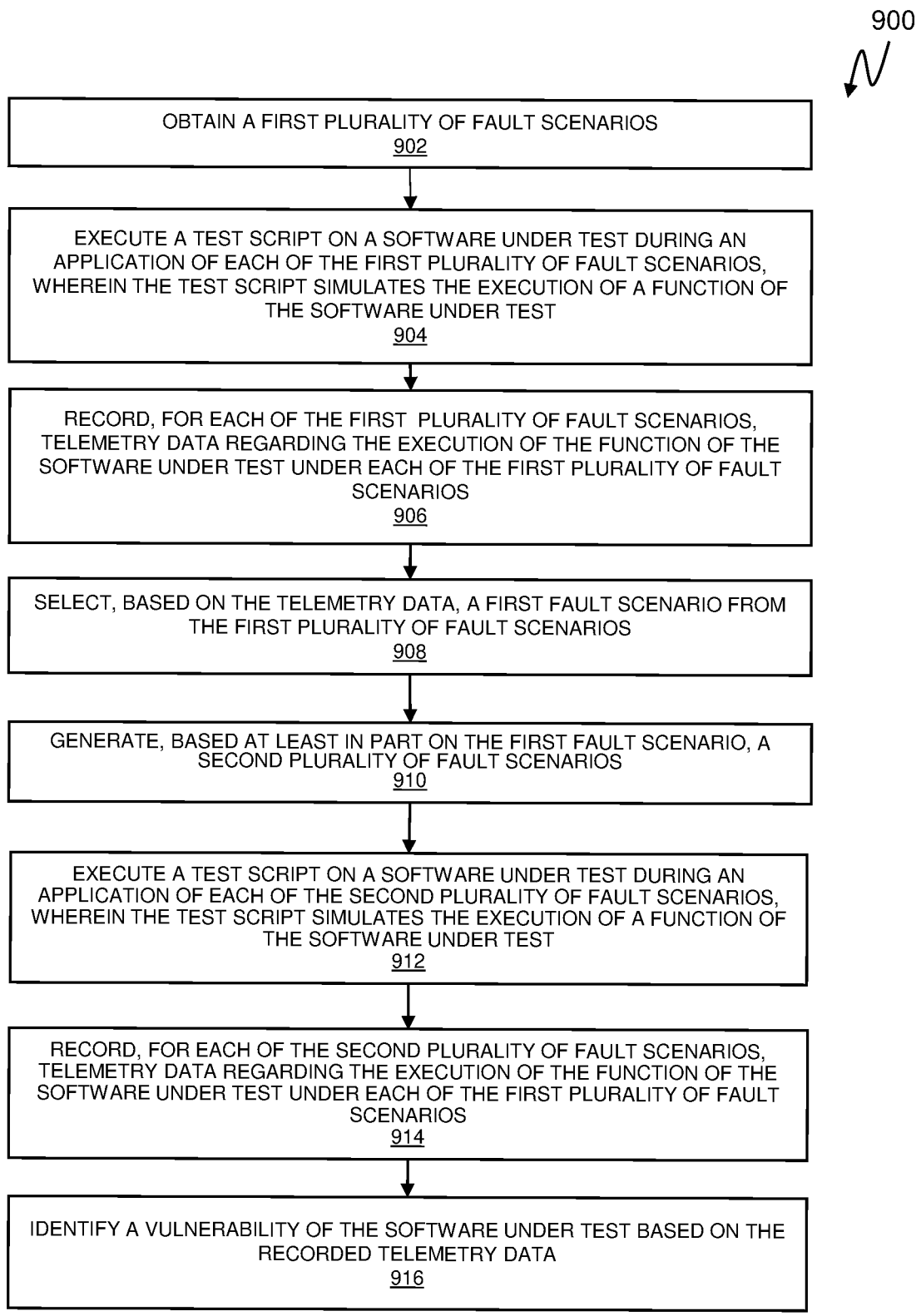
FIG. 9 depicts a flowchart of an example method for automated software testing using chaos engineering in accordance with one or more embodiments.

Referring now to FIG. 9, a flowchart of a method 900 for performing automated software testing using chaos engineering with chaos engineering in accordance with one or more embodiments is shown. The method 900 is described with reference to FIGS. 1 to 7 and may include additional steps not depicted in FIG. 9. Although depicted in a particular order, the blocks depicted in FIG. 9 can be, in some embodiments, rearranged, subdivided, and/or combined.

At block 902, the method 900 begins by obtaining a first plurality of fault scenarios. Each fault scenario includes an anomaly that is applied to a computing resource of a configuration of a computing environment where the software under test is operating. The configuration of the computing environment includes a plurality of computing resources such as computing systems, communications links, data storage devices, and the like. Each anomaly is a disruption or failure of one or more of the computing resources in the configuration. In one embodiment, each anomaly includes one or more of a failure rate and a capacity reduction that is applied to a computing resource, a start time of the anomaly, and an end time of the anomaly.

In one embodiment, the fault scenarios may be obtained based at least in part on the configuration of the computing environment. For example, the chaos engine may be configured to obtain the configuration of the computing environment and to identify a plurality of fault scenarios based on the configuration of computing environment of the software under test. This identification may be based on identifying one or more previously generated fault scenarios that were applied to similar configurations.

In one embodiment, at least one of the plurality of fault scenarios may be randomly generated by the chaos engine. For example, the chaos engine may be configured to obtain the configuration of computing environment of the service under test, identify the computing resources in the configuration, and generate a random set of anomalies to create each of the fault scenarios. Each of the anomalies may include both a failure rate and a start and end time.

At block 904, the method 900 includes executing a test script on software under test during an application of each of the first plurality of fault scenarios, wherein the test script simulates the execution of a function of the software under test.

In one embodiment, one or more of the test scripts are manually generated by an owner/developer of the software under test. In one embodiment, one or more of the test scripts are automatically generated based on a machine learning analysis of prior use of the software under test. In one embodiment, one or more of the test scripts are automatically generated based on analysis of an API specification of the software under test. In one embodiment, each of the test scripts corresponds to a function of the software under test and obtaining a set of test scripts to simulate use of the software under test includes obtaining test scripts related to an identified function to be exercised. The identified function to be exercised may be specified by an owner/developer or tester of the software under test. In one embodiment, the functions of the software under test are assigned priority level and functions and corresponding test scripts to be executed on the software under test are selected based on the priority level of the functions.

In one embodiment, executing a test script on software under test during an application of each of the plurality of fault scenarios includes simulating the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include a memory pressure of a memory device on a computing resource and the memory pressure can be simulated by executing a task by a processor to utilize a specified percentage of the memory device.

At block 906, the method 900 includes recording, for each of the first plurality of fault scenarios, telemetry data regarding the execution of the function of the software under test under each of the first plurality of fault scenarios. In one embodiment, the telemetry data is collected by the computing environment and recorded in a telemetry metric database. The telemetry data provides real-time information about the state, performance, availability, and reliability of the computing resources utilized by the service under test. The telemetry data indicates whether an action associated with the function was successfully completed during each fault scenario. In addition, as discussed in more detail above, the collected telemetry data can include, but are not limited to CPU usage, memory usage, disk I/O, network traffic, system load, application performance, event logs, power and temperature, and other custom metrics.

In one embodiment, one or more test scripts corresponding to each function of the software under test are executed multiple times during each fault scenario. Telemetry data indicating whether actions associated with the function successfully completed during the application of each fault scenario are collected and analyzed. In one embodiment, a service level indicator (SLI) corresponding to each function is calculated for each fault scenario based on the collected telemetry data. In one embodiment, the success or failure of a function is determined by return value(s) of the function, rather than by telemetry recorded by the software under test. In these embodiments, the return values may be recorded in the telemetry metric database.

At block 908, the method 900 includes selecting, based on the telemetry data, a first fault scenario from the first plurality of fault scenarios. In some embodiments, multiple fault scenarios can be identified based on the first plurality of fault scenarios. In one embodiment, the first fault scenario is selected based on a determination that a SLI, calculated based on the telemetry data, corresponding to a fault scenario deviates from a SLO by more than a threshold amount. In one embodiment, one or more of the SLO and the threshold amount are provided by a developer of the software under test. In one embodiment, SLIs are calculated for each function of the software under test during the application of each of the first set fault scenarios and are compared with the expected value for each SLI to identify the first fault scenario as the fault scenario having the SLIs with the highest deviation from the expected value.

At block 910, the method 900 includes generating, based at least in part on the first fault scenario, a second plurality of fault scenarios. In one embodiment, the chaos engine generates the second plurality of fault scenarios based at least in part on the first fault scenario. In one embodiment, the second plurality of fault scenarios are generated by applying random changes to the first fault scenario. In another embodiment, the chaos engine analyses the calculated SLIs corresponding to the first fault scenario and the anomalies applied in the first fault scenario and generates the second plurality of fault scenarios by making incremental changes to the anomalies applied in the first fault scenario.

At block 912, the method 900 includes execute a test script on software under test during an application of each of the second plurality of fault scenarios, wherein the test script simulates the execution of a function of the software under test. In one embodiment, applying each of the plurality of fault scenarios includes simulating the one or more anomalies specified by the fault scenario in the computing environment in which the service under test is executing.

At block 914, the method 900 includes recording, for each of the second plurality of fault scenarios, telemetry data regarding the execution of the function of the software under test under each of the first plurality of fault scenarios. In one embodiment, the telemetry data is collected by the computing environment and recorded in a telemetry metric database. The telemetry data provides real-time information about the state, performance, availability, and reliability of the computing resources utilized by the service under test. The telemetry data indicates whether an action associated with the function were successfully completed during each fault scenario. In addition, as discussed in more detail above, the collected telemetry data can include, but are not limited to CPU usage, memory usage, disk I/O, network traffic, system load, application performance, event logs, power and temperature, and other custom metrics.

At block 916, the method 900 includes identifying a vulnerability of the software under test based on the recorded telemetry data. In one embodiment, a vulnerability of the software under test is identified based on recorded error data and crash data of the software under test. For example, fault scenarios that result in a crash of the software under test or the software under test generating an error message are identified as corresponding to a vulnerability of the software under test. In general, a vulnerability of the software under test is a susceptibility of the software under test to an anomaly of one or more computing resources. For example, one vulnerability of the software under test may be a susceptibility of the software under test to a dropped packet anomaly in which a dropped packet rate is greater that a specific percentage. In one embodiment, these fault scenarios can be reported to the owner/developer of the software under test for further analysis. In one embodiment, the vulnerability of the software under test is identified based on a commonality of a group of the fault scenarios that have SLIs, calculated based on the telemetry data, that deviate from a SLO by more than a threshold amount. In one embodiment, one or more of the SLO and the threshold amount are provided by a developer of the software under test.

In one example, when a plurality of fault scenarios each result in SLIs that fail to meet the corresponding SLOs, the anomalies that make up each fault scenario can be compared to identify one or more common anomalies (e.g., anomalies having the same type and/or anomalies applied to the same computing resource). These common anomalies can be identified as vulnerabilities of the software under test. For example, a Completion Rate SLI of a function of the service under test may be calculated to be 89% based on the telemetry data and the expected value of the Completion Rate SLI is 95% with a threshold deviation amount of 5%. In this example, the calculated Completion Rate SLI associated with a first fault scenario deviates from the expected value 95% by more than the threshold amount of 5%.

In one embodiment, the expected value of the service level indicator and the threshold amount are received from a developer of the software under test. In one embodiment, the developer of the software under test may provide SLOs that include an expected SLI value and a threshold deviation amount for each SLI. In another example, the developer of the software under test may provide SLOs that include a minimum and/or maximum value for each SLI.

In another embodiment, the expected value of the service level indicator is obtained based on an analysis of telemetry data regarding the operation of the service under test under normal operating conditions. For example, the service under test may be executed without the application of any chaos experiments and telemetry data can be collected and analyzed to calculate the expected values for each SLI.

Figure 10:
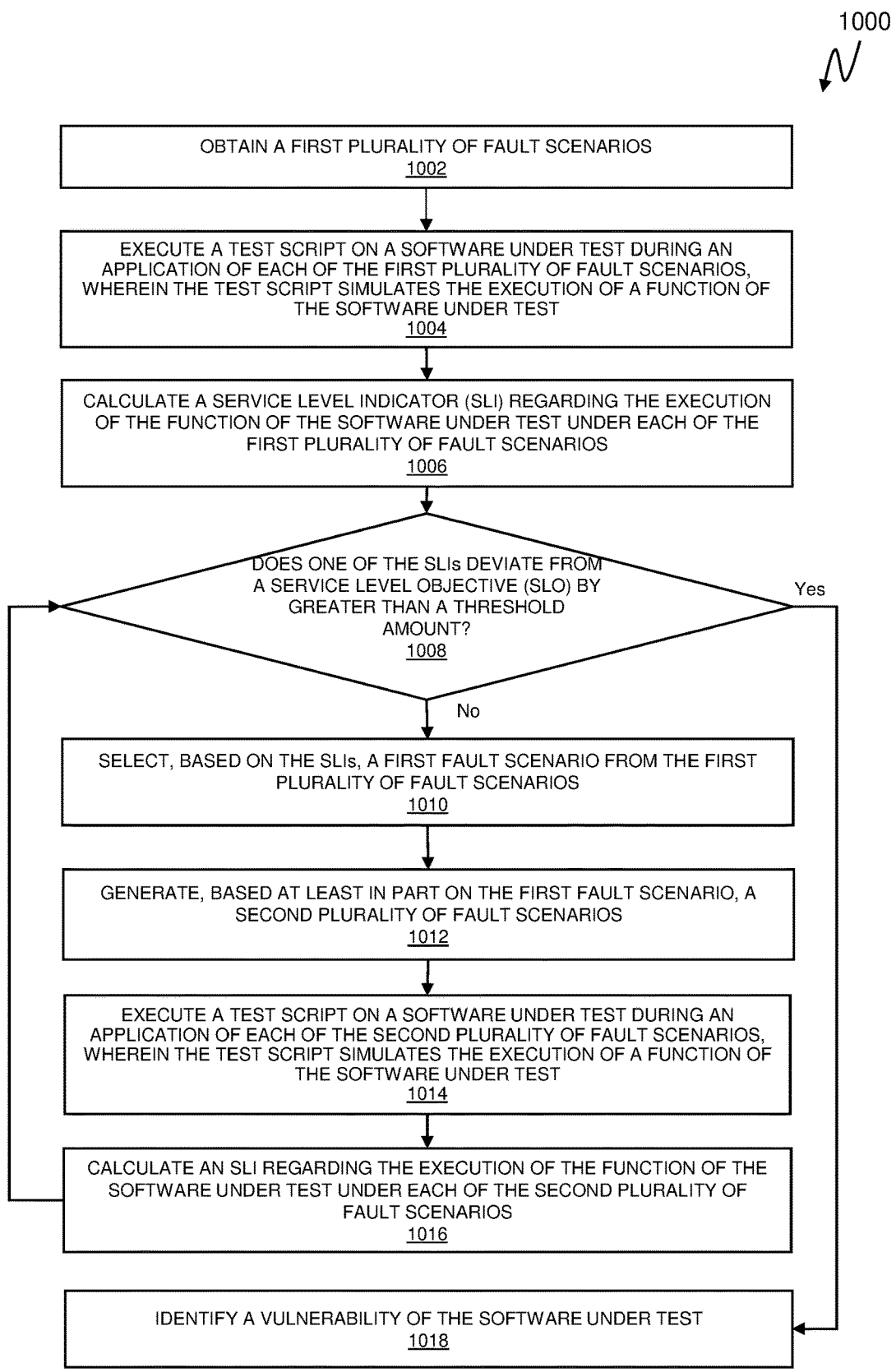
FIG. 10 depicts a flowchart of an example method for performing automated software testing using chaos engineering in accordance with one or more embodiments.

Referring now to FIG. 10, a flowchart of a method 1000 for performing automated software testing using chaos engineering with chaos engineering in accordance with one or more embodiments is shown. The method 1000 is described with reference to FIGS. 1 to 7 and may include additional steps not depicted in FIG. 10. Although depicted in a particular order, the blocks depicted in FIG. 10 can be, in some embodiments, rearranged, subdivided, and/or combined.

At block 1002, the method 1000 begins by obtaining a first plurality of fault scenarios. Each fault scenario includes an anomaly that is applied to a computing resource of a configuration of a computing environment where the software under test is operating. The configuration of the computing environment includes a plurality of computing resources such as computing systems, communications links, data storage devices, and the like. Each anomaly is a disruption or failure of one or more of the computing resources in the configuration. In one embodiment, each anomaly includes one or more of a failure rate and a capacity reduction that is applied to a computing resource, a start time of the anomaly, and an end time of the anomaly.

At block 1004, the method 1000 includes executing a test script on software under test during an application of each of the first plurality of fault scenarios, wherein the test script simulates the execution of a function of the software under test.

In one embodiment, one or more of the test scripts are manually generated by an owner/developer of the software under test. In one embodiment, one or more of the test scripts are automatically generated based on a machine learning analysis of prior use of the software under test. In one embodiment, one or more of the test scripts are automatically generated based on analysis of an API specification of the software under test. In one embodiment, each of the test scripts corresponds to a function of the software under test and obtaining a set of test scripts to simulate use of the software under test includes obtaining test scripts related to an identified function to be exercised. The identified function to be exercised may be specified by an owner/developer or tester of the software under test. In one embodiment, the functions of the software under test are assigned priority level and functions and corresponding test scripts to be executed on the software under test are selected based on the priority level of the functions.

In one embodiment, executing the test script on the software under test during the application of each of the plurality of fault scenarios includes simulating the one or more anomalies specified by the fault scenario in the computing environment in which the service under test is executing. For example, a fault scenario may include a partial failure of a transmission link and this failure of the transmission link can be simulated by instructing a router or switch associated with the transmission link to drop a specified percentage of the packets using the transmission link. In another example, another fault scenario may include a memory pressure of a memory device on a computing resource and the memory pressure can be simulated by executing a task by a processor to utilize a specified percentage of the memory device.

At block 1006, the method 1000 includes calculating a service level indicator (SLI) regarding the execution of the function of the software under test during the application of each of the first plurality of fault scenarios. In one embodiment, telemetry data indicating whether actions associated with the function were successfully completed during each fault scenario are collected and analyzed. In one embodiment, SLIs corresponding to each function is calculated for each fault scenario based on the collected telemetry data.

At decision block 1008, the method 1000 includes determining whether one of the calculated SLIs deviate from a service level objective (SLO) by more than a threshold amount. In one embodiment, one or more of the SLO and the threshold amount are provided by a developer of the software under test. Based on a determination that an SLI deviates from an SLO by more than a threshold amount, the method 1000 proceeds to block 1018.

At block 1010, the method 1000 includes selecting, based on the SLIs, a first fault scenario from the first plurality of fault scenarios. In one embodiment, SLIs are calculated for each function of the software under test during the application of each of the first set fault scenarios and are compared with the expected value for each SLI to identify the first fault scenario as the fault scenario having the SLIs with the highest deviation from the expected value.

At block 1012, the method 1000 includes generating, based at least in part on the first fault scenario, a second plurality of fault scenarios. In one embodiment, the chaos engine generates the second plurality of fault scenarios based at least in part on the first fault scenario. In one embodiment, the second plurality of fault scenarios are generated by applying random changes to the first fault scenario. In another embodiment, the chaos engine analyses the calculated SLIs corresponding to the first fault scenario and the anomalies applied in the first fault scenario and generates the second plurality of fault scenarios by making incremental changes to the anomalies applied in the first fault scenario.

At block 1014, the method 1000 includes executing a test script on software under test during an application of each of the second plurality of fault scenarios, wherein the test script simulates the execution of a function of the software under test. In one embodiment, executing the test script on the software under test during the application of each of the second plurality of fault scenarios includes simulating the one or more anomalies specified by each of the second plurality of fault scenario in the computing environment in which the service under test is executing.

At block 1016, the method 1000 includes calculating a service level indicator (SLI) regarding the execution of the function of the software under test during the application of each of the second plurality of fault scenarios. In one embodiment, telemetry data indicating whether actions associated with the function were successfully completed during each fault scenario are collected and analyzed. In one embodiment, SLIs corresponding to each function is calculated for each fault scenario based on the collected telemetry data. Once the SLIs for the second set of fault scenarios are calculated, the method 1000 returns to decision block 1008.

At block 1018, the method 1000 includes identifying a vulnerability of the software under test. In one embodiment, the vulnerability of the software under test is identified based the anomalies of fault scenarios that have SLIs, calculated based on the telemetry data, that deviate from a SLO by more than a threshold amount.

In one embodiment, a vulnerability of the software under test is identified based on recorded error data and crash data of the software under test. For example, fault scenarios that result in a crash of the software under test or the software under test generating an error message are identified as corresponding to a vulnerability of the software under test. In general, a vulnerability of the software under test is a susceptibility of the software under test to an anomaly of one or more computing resources. For example, one vulnerability of the software under test may be a susceptibility of the software under test to a dropped packet anomaly in which a dropped packet rate is greater that a specific percentage. In one embodiment, these fault scenarios can be reported to the owner/developer of the software under test for further analysis. In one embodiment, the vulnerability of the software under test is identified based on a commonality of a group of the fault scenarios that have SLIs, calculated based on the telemetry data, that deviate from a SLO by more than a threshold amount. In one embodiment, one or more of the SLO and the threshold amount are provided by a developer of the software under test.

In one example, when a plurality of fault scenarios each result in SLIs that fail to meet the corresponding SLOs, the anomalies that make up each fault scenario can be compared to identify one or more common anomalies (e.g., anomalies having the same type and/or anomalies applied to the same computing resource). These common anomalies can be identified as vulnerabilities of the software under test. For example, a Completion Rate SLI of a function of the service under test may be calculated to be 89% based on the telemetry data and the expected value of the Completion Rate SLI is 95% with a threshold deviation amount of 5%. In this example, the calculated Completion Rate SLI associated with a first fault scenario deviates from the expected value 95% by more than the threshold amount of 5%.

Figure 11:
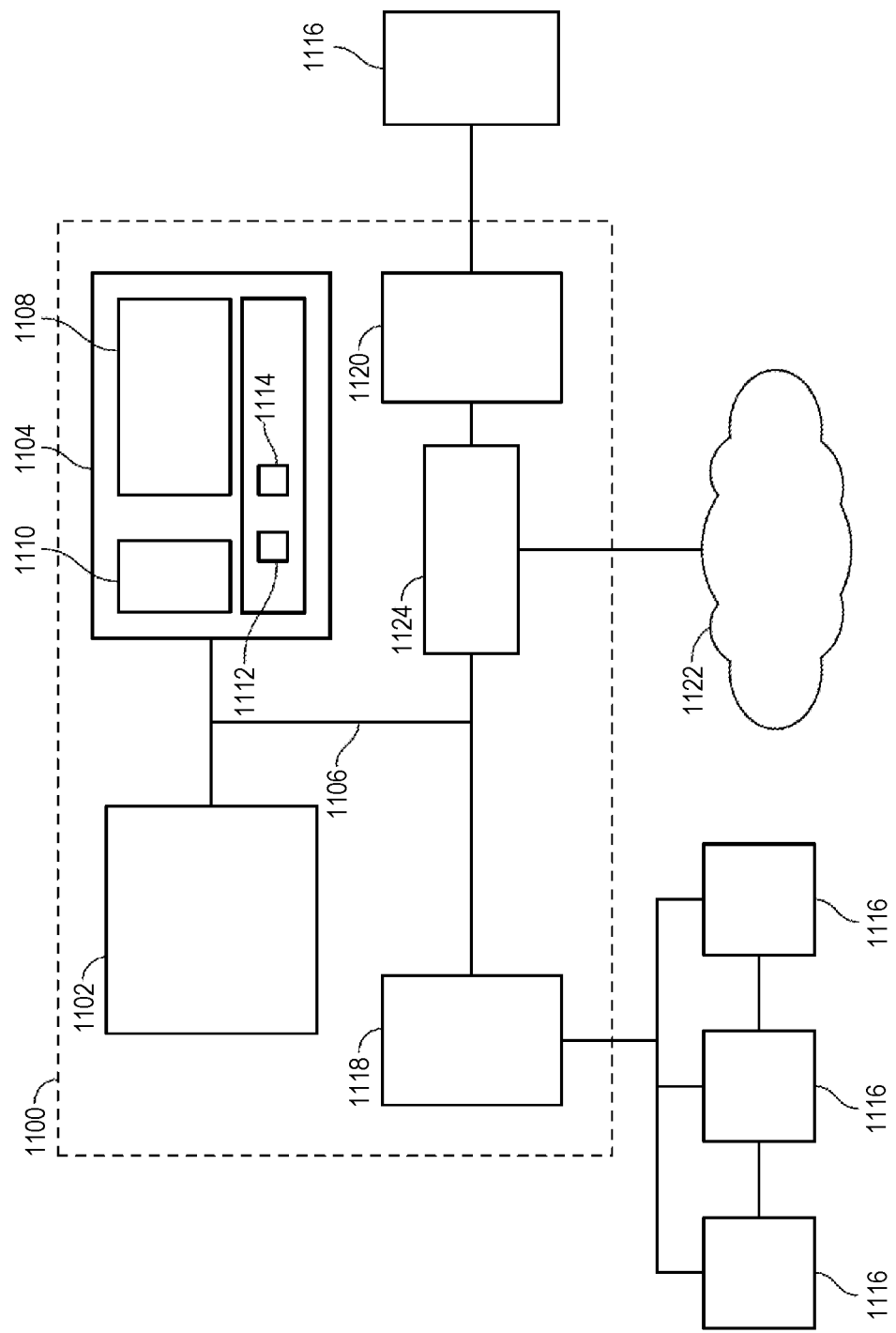
FIG. 11 depicts a block diagram of an example computer system according to one or more embodiments.

FIG. 11 illustrates aspects of an embodiment of a computer system 1100 that can perform various aspects of embodiments described herein. In some embodiments, the computer system(s) 1100 can implement and/or otherwise be incorporated within or in combination with any of the methods 800, 900, and 1000 described previously herein. In some embodiments, a computer system 1100 can be configured to carry out the functionality of the testing environment 110. In some embodiments, a computer system 1100 can be configured to carry out the functionality of one or more of the computing environment 110, the performance analysis system 120, and the chaos engine 130.

The computer system 1100 includes at least one processing device 1102, which generally includes one or more processors or processing units for performing a variety of functions, such as, for example, completing any portion of the methods 800, 900, and 1000 described previously herein. Components of the computer system 1100 also include a system memory 1104, and a bus 1106 that couples various system components including the system memory 1104 to the processing device 1102. The system memory 1104 may include a variety of computer system readable media. Such media can be any available media that is accessible by the processing device 1102, and includes both volatile and non-volatile media, and removable and non-removable media. For example, the system memory 1104 includes a non-volatile memory 1108 such as a hard drive, and may also include a volatile memory 1110, such as random access memory (RAM) and/or cache memory. The computer system 1100 can further include other removable/non-removable, volatile/non-volatile computer system storage media.

The system memory 1104 can include at least one program product having a set (e.g., at least one) of program modules that are configured to carry out functions of the embodiments described herein. For example, the system memory 1104 stores various program modules that generally carry out the functions and/or methodologies of embodiments described herein. A module or modules 1112, 1114 may be included to perform functions related to the methods 800, 900, and 1000 as described previously herein. The computer system 1100 is not so limited, as other modules may be included depending on the desired functionality of the computer system 1100. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 1102 can also be configured to communicate with one or more external devices 1116 such as, for example, a keyboard, a pointing device, and/or any devices (e.g., a network card, a modem) that enable the processing device 1102 to communicate with one or more other computing devices. Communication with various devices can occur via Input/Output (I/O) interfaces 1118 and 1120.

The processing device 1102 may also communicate with one or more networks 1122 such as a local area network (LAN), a general wide area network (WAN), a bus network and/or a public network (e.g., the Internet) via a network adapter 1124. In some embodiments, the network adapter 1124 is or includes an optical network adaptor for communication over an optical network. It should be understood that although not shown, other hardware and/or software components may be used in conjunction with the computer system 1100. Examples include, but are not limited to, microcode, device drivers, redundant processing units, external disk drive arrays, RAID systems, and data archival storage systems.

While the disclosure has been described with reference to various embodiments, it will be understood by those skilled in the art that changes may be made and equivalents may be substituted for elements thereof without departing from its scope. The various tasks and process steps described herein can be incorporated into a more comprehensive procedure or process having additional steps or functionality not described in detail herein. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

Unless defined otherwise, technical and scientific terms used herein have the same meaning as is commonly understood by one of skill in the art to which this disclosure belongs.

Various embodiments of the disclosure are described herein with reference to the related drawings. The drawings depicted herein are illustrative. There can be many variations to the diagrams and/or the steps (or operations) described therein without departing from the spirit of the disclosure. For instance, the actions can be performed in a differing order or actions can be added, deleted or modified. All of these variations are considered a part of the present disclosure.

The terminology used herein is for the purpose of describing particular embodiments only and is not intended to be limiting. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. The term "or" means "and/or" unless clearly indicated otherwise by context.

The terms "received from", "receiving from", "passed to," and "passing to" describe a communication path between two elements and does not imply a direct connection between the elements with no intervening elements/connections therebetween unless specified. A respective communication path can be a direct or indirect communication path.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Various embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a plurality of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments described herein have been presented for purposes of illustration, but are not intended to be exhaustive or limited to the form(s) disclosed. The embodiments were chosen and described in order to best explain the principles of the disclosure. Many modifications and variations will be apparent to those of ordinary skill in the art without departing from the scope and spirit of the described embodiments. The terminology used herein was chosen to best explain the principles of the various embodiments, the practical application or technical improvement over technologies found in the marketplace, or to enable others of ordinary skill in the art to understand the embodiments described herein.

What is claimed is:

1. A method comprising:
   obtaining a plurality of fault scenarios;
   executing a test script on software under test during application of each of the plurality of fault scenarios, wherein the test script simulates execution of a function of the software under test;
   recording, for each of the plurality of fault scenarios, telemetry data regarding the execution of the function of the software under test; and
   identifying a vulnerability of the software under test based on the recorded telemetry data,
   wherein the software under test is operating in a computing environment having a configuration that comprises a plurality of computing resources;
   wherein each of the fault scenarios include an anomaly that is applied by the test script to one of the plurality of computing resources of the configuration; and
   wherein the test script is configured to define an anomaly rate and a start time and an end time for applying each respective anomaly while executing the test script.

2. The method of claim 1, wherein at least one of the plurality of fault scenarios includes a plurality of anomalies, that include the anomaly, and wherein at least one of the plurality of anomalies are applied to different computing resources of the configuration.

3. The method of claim 1, where at least one of the fault scenarios are randomly generated.

4. The method of claim 1, wherein the vulnerability of the software under test is identified based on one of:
   a commonality of a group of the fault scenarios that correspond to recorded telemetry data having a service level indicator that deviates from a service level objective by more than a threshold amount;
   fault scenarios that correspond to recorded telemetry data having the service level indicator that deviates from the service level objective by more than a threshold amount; and
   fault scenarios that correspond to a crash or error generated by the software under test.

5. The method of claim 1, wherein the telemetry data includes whether an action associated with the function successfully completed.

6. The method of claim 1, wherein the test script is created based on one or more of observed user interactions with the software under test and an application programing interface specification of the software under test.

7. The method of claim 1, wherein the test script corresponds to the function of the software under test and the test script is obtained based on one or more of a user selection of the function and a priority level associated with the function.

8. A method comprising:
   obtaining a first plurality of fault scenarios;
   executing a test script on software under test during application of each of the first plurality of fault scenarios, wherein the test script simulates execution of a function of the software under test;
   recording, for each of the first plurality of fault scenarios, telemetry data regarding the execution of the function of the software under test;
   selecting, based on the telemetry data, a first fault scenario from the first plurality of fault scenarios;
   generating, based at least in part on the first fault scenario, a second plurality of fault scenarios;
   executing the test script on the software under test during the application of each of the second plurality of fault scenarios; and
   identifying a vulnerability of the software under test based on the recorded telemetry data;
   wherein each of the fault scenarios includes an anomaly that is applied by the test script to one of a plurality of computing resources used when executing the test script; and
   wherein the test script is configured to define an anomaly rate and a start time and an end time for applying each respective anomaly while executing the test script.

9. The method of claim 8, wherein the software under test is operating in a computing environment having a configuration that comprises the plurality of computing resources and wherein each of the first plurality of fault scenarios and the second plurality of fault scenarios include an anomaly that is applied to one of the plurality of computing resources of the configuration.

10. The method of claim 9, wherein the first plurality of fault scenarios is obtained based at least in part on the configuration.

11. The method of claim 10, wherein at least one of the first plurality of fault scenarios are randomly generated.

12. The method of claim 8, further comprising calculating a service level indicator corresponding to each of the first plurality of fault scenarios, the service level indicator indicating a performance of the function.

13. The method of claim 12, wherein the first fault scenario is selected based on a determination that the service level indicator corresponding to the first fault scenario deviates from an expected value by more than a threshold amount.

14. The method of claim 8, wherein the test script is automatically created based on one or more of observed user interactions with the software under test and an application programing interface specification of the software under test.

15. The method of claim 8, wherein the test script corresponds to the function of the software under test and the test script is obtained based on one or more of a user selection of the function and a priority level associated with the function.

16. A method comprising:
    obtaining a plurality of fault scenarios;
    executing a test script on software under test during application of each of the plurality of fault scenarios, wherein the test script simulates execution of a function of the software under test;
    recording, for each of the plurality of fault scenarios, telemetry data regarding the execution of the function of the software under test;
    calculating, based on the recorded telemetry data, a service level indicator regarding the execution of the function of the software under test during the application of each of the plurality of fault scenarios;
    determining that the service level indicator deviates from a service level objective by more than a threshold amount; and
    identifying a vulnerability of the software under test;
    wherein each of the fault scenarios includes an anomaly that is applied by the test script to one of a plurality of computing resources used when executing the test script; and
    wherein the test script is configured to define an anomaly rate and a start time and an end time for applying each respective anomaly while executing the test script.

17. The method of claim 16, wherein the software under test is operating in a computing environment having a configuration that comprises the plurality of computing resources and wherein each of the fault scenarios include an anomaly that is applied to one of the plurality of computing resources of the configuration.

18. The method of claim 16, wherein the vulnerability of the software under test is identified based on one of:
    a commonality of a group of the fault scenarios that correspond to recorded telemetry data having a service level indicator that deviates from a service level objective by more than a threshold amount;
    fault scenarios that correspond to recorded telemetry data having the service level indicator that deviates from the service level objective by more than a threshold amount; and
    fault scenarios that correspond to a crash or error generated by the software under test.

\* \* \* \* \*